(12) United States Patent  
Bayram

(10) Patent No.: US 12,085,384 B2  
(45) Date of Patent: Sep. 10, 2024

(54) SYSTEM AND METHOD FOR EVALUATING A STATUS OF A MATERIAL IN METALLURGICAL VESSELS

(71) Applicant: PaneraTech, Inc., Chantilly, VA (US)

(72) Inventor: Yakup Bayram, Falls Church, VA (US)

(73) Assignee: PANERATECH, INC., Chantilly, VA (US)

( * ) Notice: Subject to any disclaimer, the term of this patent is extended or adjusted under 35 U.S.C. 154(b) by 343 days.

(21) Appl. No.: 17/553,903

(22) Filed: Dec. 17, 2021

(65) Prior Publication Data

US 2022/0196396 A1 Jun. 23, 2022

Related U.S. Application Data

(60) Provisional application No. 63/126,584, filed on Dec. 17, 2020.

(51) Int. Cl.
*G01B 15/02* (2006.01)
*G01B 11/30* (2006.01)
*G06N 20/00* (2019.01)

(52) U.S. Cl.
CPC .......... *G01B 15/025* (2013.01); *G01B 11/303* (2013.01); *G06N 20/00* (2019.01)

(58) Field of Classification Search
CPC ............................. G01B 15/025; G06N 20/00
USPC ......................................................... 702/170
See application file for complete search history.

(56) References Cited

U.S. PATENT DOCUMENTS

| | | |
|---|---|---|
| 5,781,008 A | 7/1998 | Muller et al. |
| 6,130,637 A | 10/2000 | Meszaros et al. |
| 6,198,293 B1 | 3/2001 | Woskov et al. |
| 9,255,794 B2 | 2/2016 | Walton et al. |
| 9,880,110 B2 | 1/2018 | Ruege et al. |
| 10,054,367 B2 | 8/2018 | Bayram et al. |
| 10,151,709 B2 | 12/2018 | Bayram et al. |

(Continued)

FOREIGN PATENT DOCUMENTS

| WO | 2011/089621 | 7/2011 |
|---|---|---|
| WO | 2021/207044 | 10/2021 |

OTHER PUBLICATIONS

International Search Report issued in co-pending application No. PCT/US21/63960 on Mar. 8, 2022.

*Primary Examiner* — Ricky Go

(74) *Attorney, Agent, or Firm* — Whiteford, Taylor & Preston, LLP; Gregory M. Stone

(57) ABSTRACT

Disclosed is a system and method for evaluating a status of a refractory material in metallurgical vessels, including furnaces and ladles, wherein a slag buildup is formed on the surface of such material as a result of scrap accumulation and chemical reactions occurring during the melting of metals in such vessels. The system and method are operative to determine both a rate of degradation of the material under evaluation, including the thickness of such material, and a measure of the slag buildup to predict and extend the operational life and improve the maintenance plan of the vessel. The system is capable of determining the thickness of and the slag buildup on the entire material under evaluation by sampling a number of regions of such material with different types of sensors, characterizing the surface profile of such material, and using appropriate signal processing techniques and artificial intelligence algorithms.

23 Claims, 3 Drawing Sheets

(56) References Cited

U.S. PATENT DOCUMENTS

| | | | | |
|---|---|---|---|---|
| 2007/0119351 A1* | 5/2007 | Widmer | ................ | F22B 35/00 |
| | | | | 110/342 |
| 2013/0038337 A1* | 2/2013 | Rodfalk | ................ | G01F 23/26 |
| | | | | 324/633 |
| 2015/0218667 A1* | 8/2015 | Ojeda Arroyo | ....... | G01F 23/246 |
| | | | | 73/292 |
| 2017/0131033 A1 | 5/2017 | Bayram et al. | | |
| 2018/0304348 A1* | 10/2018 | Zinni | ................ | B22D 11/165 |

* cited by examiner

SYSTEM AND METHOD FOR EVALUATING A STATUS OF A MATERIAL IN METALLURGICAL VESSELS

CROSS REFERENCE TO RELATED APPLICATION

This application is based upon and claims priority from U.S. Provisional Patent Application Ser. No. 63/126,584, entitled "SYSTEM AND METHOD FOR EVALUATING A STATUS OF A MATERIAL IN METALLURGICAL VESSELS," filed with the U.S. Patent and Trademark Office on Dec. 17, 2020, by the inventor herein, the specification of which is incorporated herein by reference.

FIELD OF THE INVENTION

The present invention relates to systems for evaluating the status of a material. More particularly, the present invention relates to sensing systems and methods for monitoring and determining the condition of refractory material using data from different sensors.

BACKGROUND OF THE INVENTION

A number of evaluation methods and systems have been disclosed within various industries for measuring the properties during and after formation of certain materials, using electromagnetic waves. The surface characteristics, slag buildup, internal homogeneity, residual material thickness, rate of erosion of a material, and level and rate of penetration of a first material into a second material are some of the important attributes that may require monitoring and evaluation. Notably, the type and disposition of the sensors around the material under evaluation play a crucial role in determining the extent to which these attributes can be measured.

Metallurgical industries use vessels, such as furnaces and ladles, to melt, treat, refine, and transport the raw material used for processing. They are key assets for manufacturers in terms of costs and operational functionality. In order to minimize the internal heat loss at high operating temperatures, these furnaces and ladles are constructed using refractory material, having very high melting temperatures and good insulation properties, to create a refractory melting chamber.

However, the inner refractory walls of a metallurgical vessel will degrade during operation. The effects of this degradation include refractory erosion, refractory corrosion, stress cracks, and refractory material diffusion into the molten material. On the other hand, as the refractory material degrades over time, the molten material may accumulate on the degraded surface of or penetrate into the refractory material accelerating the degradation process and creating a high risk for molten material leakage through the refractory wall with potentially devastating consequences. As a result, manufacturers may be misled and face an increased risk of experiencing either an unexpected leakage of molten material through the furnace wall or an increased uncertainty to conservatively shut down the furnace for re-build to reduce the likelihood of any potential leakage, based on the manufacturer's experience of the expected lifetime of the furnace.

Specifically, the use of microwave sensors to measure the thickness of materials such as furnace walls have been addressed in the prior art, as described in U.S. Pat. No. 6,198,293 to Woskov et al. and U.S. Pat. No. 9,255,794 to Walton et al. However, these efforts have faced certain challenges and limitations. In particular, these attempts made to determine furnace wall thickness on hot furnaces have been challenged by the large signal losses involved in evaluating the inner surface of refractory materials, especially by using a microwave signal transmitted from outside the furnace at relatively high frequency bands. Likewise, at relatively low frequency bands signals still experience losses and are limited in terms of the bandwidth and resolution required by existing systems. Moreover, in placing system components close to the surface of the refractory material to be evaluated, spurious signal reflections make it difficult to isolate the reflected signal of interest, thus further complicating the evaluation of the status of either the inner surface or the interior of such materials. A major challenge is that furnace walls become more electrically conductive as temperature increases. Therefore, signals going through a hot furnace wall experience significant losses making the detection of these signals very challenging. Additionally, in most cases the monitoring sensors require direct physical access to the refractory material under evaluation and are sensitive to the presence of certain objects nearby, especially those made of metallic material.

Additional efforts have been made to evaluate the status of a material, using electromagnetic wave sensors, by reducing the losses and level of spurious signals involved in evaluating refractory materials, as described in U.S. Pat. No. 10,151,709 to Bayram et al., U.S. Pat. No. 9,880,110 to Ruege et al., and U.S. Pat. No. 10,054,367 to Bayram et al. However, these systems are primarily aimed to mitigate the effects caused by the multiple reflections of the electromagnetic waves used, as an attempt to reduce the clutter associated with a received signal. In addition, these efforts have focused on standalone systems transmitting electromagnetic waves from outside the furnace into the refractory material. As a result, these efforts become ineffective in the case of a furnace or ladle surrounded by either an outer shell or certain supporting structures, wherein such shell and structures are made of a highly conductive material and impair the propagation of electromagnetic waves through them, or for applications in areas of difficult access where an external evaluation system cannot be properly set up.

A further attempt to integrate electromagnetic wave sensors embedded in the refractory material of a metallurgical vessel has been addressed in the prior art, as described in International PCT App. No. PCT/US2021/025706 by Bayram. However, this approach is limited to newly built or reconstructed vessels at very specific locations, resulting in potential constraints for cost-effectively evaluating the entire refractory material of a vessel. In addition, although this approach is effective in measuring the refractory thickness at certain locations of the vessel, it does not provide a measure of the slag buildup. In addition, the referenced prior art does not teach how to integrate this approach with existing sensors, such as laser- or infrared- or stereovision-based devices, typically used in the steel industry to measure the surface profile of the refractory material of the vessel.

Particularly in steel metallurgy a basic oxygen furnace or electric arc furnace is used for high-speed melting of the steel and carrying out metallurgical reactions to adjust the final chemical composition of the steel. Later, molten steel is transported to a ladle for further refining, which includes the addition of deoxidizers, slag formers, desulfurizers, and alloying agents. These additives along with the high temperatures at which the ladle operate accelerate and contribute to a severe stress, wear, and degradation of the internal walls and the bottom of the ladle, both of which are in contact with the molten material during the ladle operation.

In particular, electric-arc furnaces, with a capacity of 50 tons or more, and ladles are largely used to produce steel. These ladles need to be subject to maintenance for removal of residues and inspection, and sometimes repaired as often as on a weekly basis. Similarly, steel manufacturing may also involve blast furnaces which are subject to a continuous melting operation. These furnaces have a steel lining outside with a refractory inside that is interacting with the molten material. As the refractory degrades, the furnaces need to be maintained to ensure no unscheduled production disruption.

Moreover, the flow of molten material, such as molten steel, at high temperatures erodes and degrades the inner surface of the refractory material and creates a high risk for molten steel leakage through the refractory wall or a severe damage to the outer shell of the furnace. Furthermore, a leak of molten steel may cause significant damage to the equipment around the furnace and, most importantly, put at risk the health and life of workers. For these reasons, in most cases furnace overhauls are conducted at a substantially earlier time than needed. This leads to significant costs for manufacturers in terms of their initial investment and the reduced production capacity over the operational life of the furnace.

Thus, it is critical for furnace operators to efficiently plan maintenance and monitor refractory material degradation of the furnace walls, which may also require the determination of slag buildup, to extend the operational life of the furnace and plan required outages of the furnace when it is really necessary. The lifetime and operational capability of a ladle or furnace is affected by a number of factors, including the operational age, the average temperature of operation, the heating and cooling temperature rates, the range of temperatures of operation, the number of cycles of operation, the type and quality of the refractory material, the slag buildup on the inner refractory walls as well as the load and type of the molten material and additives used in the furnace. Each of these factors is subject to uncertainties that make it difficult to create accurate estimates of the expected lifetime of a furnace and when to perform the corresponding maintenance tasks.

On the other hand, the formation of slag in the melting of metals in a metallurgical vessel is inevitable. The composition of slag depends on the type of melting process used and the type of iron or steel being melted. The cleanliness of the metal pieces being melted, often consisting of sand-encrusted gates and risers from the casting process or rust- and dirt-encrusted scrap, significantly affects the type of slag formed during the melting operation. Additional oxides or nonmetallic compounds are formed when liquid metal is treated with materials to remove impurities or to change the chemistry of the system. Because these oxides and nonmetallics are not soluble in iron, they float in the liquid metal as an emulsion. This emulsion of slag particles remains stable if the molten iron is continuously agitated or stirred. At certain point, the flotation effects become large enough causing nonmetallics to rise to the surface of the molten metal and agglomerate as a slag.

In some instances, oxides may have a lower melting point than the prevailing metal temperature and a liquid slag is formed. In other cases, where the oxides have a higher melting point than the metal temperature, a dry, insoluble, solid slag is formed. Moreover, when slag makes contact with the refractory lining of a furnace wall or other areas of the holding vessel that are colder than the melting point of the slag, the slag is cooled below its freezing point and adheres to the refractory lining forming a slag buildup. High-melting point slags are especially prone to promoting buildup.

Because the walls of a ladle are much thinner with little insulation, more heat loss occurs in ladles when compared to the furnace refractory lining and slag buildup is inevitable. In particular, the slag that forms in electric furnace melting results from complex reactions between silica (adhering sand and dirt from casting returns), oxides from scrap, other oxidation by-products from melting and reactions with refractory linings. The resulting slag will thus consist of a complex liquid phase of oxides of iron, manganese, magnesium and silicon, silicates and sulfides plus a host of other complex compounds, which may include alumina, calcium oxides and sulfides, and rare earth oxides and sulfides.

Slag and insoluble buildup formation create problems in the production of ductile irons. If not prevented from forming or not removed as it forms, buildup will reduce the overall efficiency of the metal handling system. The task of continually keeping the ladles clean requires a significant amount of labor and maintenance materials. After a number of heats, as the slag buildup increases, it is possible to get up to one inch or more buildup on the surface of the internal refractory wall of the ladle, which greatly reduces its capacity. Also, as more batches are processed in the ladle there is often erosion of the accumulated slag buildup resulting in reentry of portions of the slag into the molten steel, thus adversely affecting its quality. Similar problems have occurred in drains or pouring channels used to conduct molten metal from the ladles.

As a consequence of the foregoing there is a need to replace the lining after 30 to 100 heats or in some instances, even sooner when the slag buildup becomes excessive and refractory wear accelerates. It is not unusual for a furnace to be shut down for maintenance multiple times a year. Further, each shut down can last up to several days, translating into a negative impact on the operational life of the furnace. On the other hand, a typical ladle may comprise a six-inch refractory layer in the areas of slag buildup. Manufacturers look to operationally use the ladle until the refractory thickness is reduced to about one to two inches. However, current techniques can indicate only the combined thicknesses of the refractory material and the slag. This means that the error in the estimation of the refractory thickness increases over time as the refractory material gets thinner. For example, in the case of a slag thickness of one inch, the estimated measurement error approaches 50% as the refractory thickness gets closer to one-inch thickness, since the estimated measured value would be about two inches, which corresponds to the combined thicknesses of the refractory material and the slag.

In particular, prediction of refractory wear is critical to industries where asset uptime is critical and asset downtime must be maintained to a minimum. Accurate refractory wear prediction will enable manufacturers to minimize repairs and keep the asset uptime. However, the issues of refractory degradation and slag buildup confluence together because existing techniques and methods used for profiling the surface of the internal walls of a furnace fail to accurately distinguish slag thickness from refractory thickness. They can only provide a measure of the combined thicknesses of both the slag buildup and the refractory. As a result, this measure may indicate that the actual degradation of the inner refractory wall of the furnace is smaller than it really is.

Current methods and techniques for measuring refractory thickness and slag buildup in metallurgical vessels, including ladles and electric arc furnaces, are primarily based on LIDAR scanning, laser scanning, infrared, stereovision, or acoustic technologies that can be used to measure only the combined residual refractory thickness and slag buildup thickness. However, these techniques do not provide a measure of the thickness of the refractory material separate from the thickness of the slag buildup. Also, the slag buildup may obstruct the sensors to accurately measure the surface roughness of the refractory material. Other approaches based on radar or acoustic technologies may provide an estimate of the refractory thickness at very specific locations of the vessel, which is impractical for estimations of refractory thickness over large areas or the entire internal walls of the furnace, and fail to provide a measure of the slag buildup.

Currently, there is no well-established method and system that can deterministically and separately estimate the slag buildup thickness and the refractory thickness associated with the internal walls of the refractory material of a furnace, since there is a direct contact of the molten material with the internal walls of the furnace resulting in the reduction of the thickness of the refractory material and the slag buildup. The lack of such method and system impairs the ability to accurately estimate both the operational life and the maintenance plan of a vast number of furnaces and ladles. Thus, there remains an opportunity for a system and method, based on the integration of at least one first sensor with at least one second sensor and a data processing component that can separately estimate the slag buildup thickness and the refractory thickness over a partial or the entire area of the refractory internal wall of the vessel.

SUMMARY OF THE INVENTION

A system and method for evaluating a status of a refractory material in metallurgical vessels, including furnaces and ladles, wherein a slag buildup is formed on the surface of such material as a result of scrap accumulation and chemical reactions occurring during the melting of metals in such vessels is disclosed herein. One or more aspects of exemplary embodiments provide advantages while avoiding disadvantages of the prior art. The system and method are operative to determine both a rate of degradation of the material under evaluation, including the thickness of such material, and a measure of the slag buildup to predict and extend the operational life and improve the maintenance plan of the vessel. The system is capable of determining the thickness of and the slag buildup on the entire material under evaluation by sampling a number of regions of such material with different types of sensors, characterizing the surface profile of such material, and using appropriate signal processing techniques and artificial intelligence algorithms.

The system for evaluating a status of a material forming part of a metallurgical vessel, such as a furnace or a ladle, comprises a plurality of subsystems. A subsystem to collect data for determining the thickness of a material under evaluation, a surface profile subsystem to characterize the surface roughness of the material under evaluation, and a data processing subsystem to manage the data collected by the two above indicated subsystems and additional input parameters to produce the results of the material evaluation for predicting and ultimately enhancing the operational life of such material. The results of the material evaluation comprise the thickness, the surface profile, and the rate of degradation of the surface over time of the material under evaluation as well as the thickness of the slag buildup on the surface of such material and an estimation of the remaining operational life of the vessel.

The subsystem for determining the thickness of the material under evaluation, further comprises a first sensor, such as a radar or an ultrasound unit, and at least one cable, both capable of withstanding temperatures above 1000° C., which are used to collect and communicate data at specific locations in the vessel. The surface profile subsystem is preferably a non-contact subsystem further comprising a second sensor, such as a laser, infrared, or stereovision unit, capable of measuring the surface roughness of the refractory internal wall of the vessel and estimate the combined thicknesses of the refractory and the slag buildup over a predefined area that includes the specific locations where the thickness of the material under evaluation has been determined. In addition, within the context of the present invention, a vessel may include a furnace or a ladle, and the terms furnace or ladle are used indistinctively as the invention applies to either one or both.

In the case of using a radar antenna, the first sensor operates by transmitting a set of electromagnetic waves into a zone having an area of interest of the material to be evaluated and defined by the coverage area of such antenna over the internal wall of the vessel. After the electromagnetic waves impinge upon such area, they are scattered and at least partly reflected by and at least partly transmitted through remote discontinuities. Any voids, flaws, the presence of a different material inside of the material to be evaluated, and any interface between two different materials, including air, may represent a remote discontinuity.

The scattered electromagnetic waves are received by the first sensor and then are measured, recorded, processed by a primary computer-based processor, and timed using as reference the electromagnetic waves transmitted or scattered from a known location of a discontinuity, such as the interface between the first sensor and the surface of the material to be evaluated. The primary computer-based processor comprises a data storage device and an executable computer code configured to measure the electromagnetic wave received by at least one antenna to produce either time domain data or frequency domain data that is transformed to time domain data. Then, these data can be used to determine a distance traveled by the electromagnetic wave received by such at least one antenna, as well-known by those skilled in the art to determine the thickness of said refractory material.

In the instance of using a laser, the second sensor operates by transmitting electromagnetic waves in the form of light into a region of the material to be evaluated, which comprises the area of interest where the first sensor transmitted the set of electromagnetic waves. After the light impinges upon such region, it is at least partly reflected and received at the second sensor and then is measured, recorded, processed by a surface profiling computer-based processor, and timed using as reference the transmitted light.

The data processing subsystem comprises a main computer-based processor and an executable computer code, which may comprise machine learning algorithms, configured to manage the data collected by the first sensor and the second sensor. One or more evaluations over an area of interest of the material under evaluation may provide the thickness and surface profile of such material, the thickness of the slag buildup, and the location of certain flaws or extraneous elements inside the material. Moreover, time domain-based and/or frequency domain-based signal processing techniques or a combination of both may be used to determine and visualize the status of the evaluated area of interest.

In the present invention, the first sensor is preferably embedded in the refractory material, more preferably using one or more casted refractory bricks, such that the radar antenna fits into the refractory material without having gaps between the antenna radiating edges and the refractory material. However, this is only possible to implement during the initial construction or during major repairs of the vessel. Alternatively, another configuration of the present invention comprises an antenna positioned inside the vessel's chamber. As a result, the refractory material of existing vessels can be evaluated too. In addition, different attachment mechanisms might be incorporated into the antenna to physically position the antenna inside the vessel's chamber. Likewise, the second sensor is preferably positioned at one or more locations inside the vessel's chamber.

The method to evaluate the status and determine the erosion profile and thickness of different materials, by combining measurements from multiple sensors with a data processing subsystem to separately estimate the slag buildup thickness and the refractory thickness over any area of or the entire refractory internal wall of a metallurgical vessel, includes the step of determining the thickness at certain locations of the internal refractory wall of a metallurgical vessel. The method further includes the steps of estimating the combined thickness of the refractory material and the slag buildup on the surface of such material over a region that includes the locations where the thickness of the refractory material has been determined. The method also includes calculating both the thickness and performing a statistical analysis, including averaging, of the slag buildup on the surface of the material under evaluation, corresponding to the locations where the thickness of the refractory material has been determined. The method further includes calculating the estimated thickness of the refractory material under evaluation and the thickness of the slag buildup, corresponding to certain predefined areas of the material under evaluation, beyond the locations where the thickness of the refractory material has been determined. The method further includes processing the data collected, estimated, or calculated to analyze, forecast, and provide information useful to extend the operational life and improve the maintenance plan of the material under evaluation and assets utilizing such material in its construction.

By integrating a plurality of sensors, such as a radar antenna and a laser scanning system, with customized computer processing tools, such as customized machine learning algorithms, wherein the radar antenna may be embedded into the refractory material or the antenna be positioned inside the chamber of a metallurgical vessel, the system and method are able to identify flaws and measure the erosion profile of and the slag buildup on the internal surface of such material. Accordingly, the actual thicknesses of the refractory material and the slag buildup for the vessel can be determined. As a result, the estimation of the remaining operational life of the vessel becomes more accurate, which in practice may represent extending the life of the vessel. This translates into more effective and accurate scheduling to better manage the costly processes of metallurgical vessel repairs, decommissioning, or replacement along with a significant reduction of the level of risk of an operational break or leakage of molten material or severe damage to the vessel metal outer shell. Thus, the system and method allow a more effective evaluation, monitoring, diagnosing, or tracking of one or more conditions, which may extend the operational life and improve the maintenance scheduling of costly and potentially risky assets, such as a metallurgical vessel.

BRIEF DESCRIPTION OF THE DRAWINGS

The numerous advantages of the present invention may be better understood by those skilled in the art by reference to the accompanying drawings in which.

DETAILED DESCRIPTION OF THE INVENTION

The following description is of particular embodiments of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The system for evaluation of a status of a material to separately estimate the thickness of such material and the thickness of a slag buildup on the surface of such material integrates a plurality of subsystems, comprising a subsystem to collect data for determining the thickness of a material under evaluation, a surface profile subsystem to characterize the surface roughness of the material under evaluation, and a data processing subsystem to manage the data from other subsystems and produce the results of the material evaluation for enhancing the operational life of such material.

Figure 1:
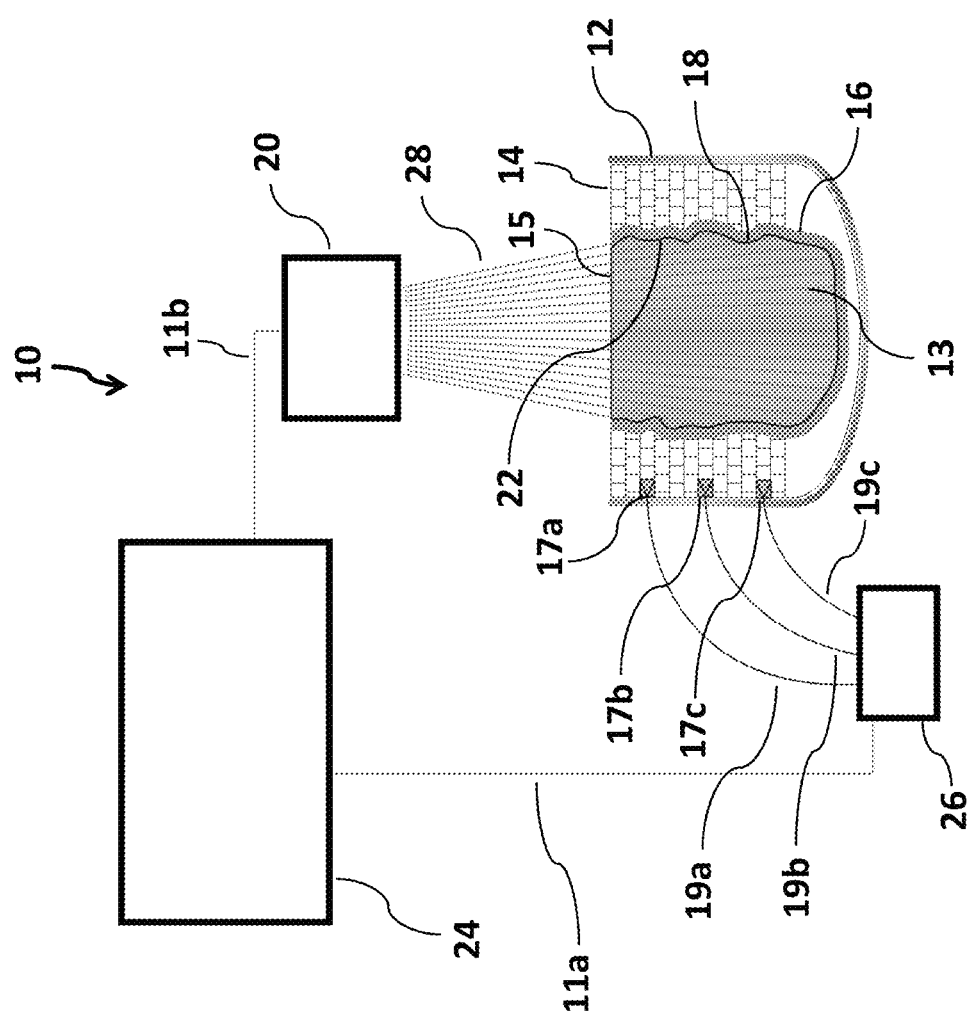
FIG. 1 shows a schematic view of an exemplary embodiment of a system for evaluating a status of a material and separately determining the thickness of a material and the thickness of the slag buildup on the surface of such material.

In accordance with certain aspects of an embodiment of the invention, FIG. 1 shows a schematic view of an exemplary embodiment of a system 10 for evaluating a status of a refractory material 14, forming part of a wall of a metallurgical vessel 12, and at least partly surrounding a chamber 15 of vessel 12. Vessel 12 has a steel outer shell in this example. In other words, refractory material 14 is disposed in one or more layers between chamber 15, wherein melting of a material, such as steel, takes place, and the external bottom and external side walls of vessel 12. Typically the various layers of refractory material 14 are formed using bricks disposed side-by-side from the bottom to the top of vessel 12. Accordingly, refractory material 14 forms one or more walls surrounding chamber 15 of vessel 12. Refractory material 14 has an inner surface 16, which in the absence of a slag buildup 18 is contiguous to (i.e., in contact with) a molten material 13, such as steel, contained within a chamber 15 of vessel 12. System 10 is intended to separately estimate the thickness of refractory material 14 and the thickness of slag buildup 18 on inner surface 16 of refractory material 14.

In this particular configuration, the subsystem to collect data for determining the thickness of the material under evaluation comprises at least one first sensor, capable of withstanding temperatures above 1000° C., and which is specifically positioned to transmit or receive electromagnetic waves and signals, such as radiofrequency or acoustic signals, from a transceiver into or from the material under evaluation. Preferably, system 10 comprises first sensor antennas 17a, 17b, 17c physically configured to reduce a plurality of reflections and probe ringing of an electromagnetic wave propagating through said first sensor antennas 17a, 17b, 17c. Furthermore, surface profiling subsystem 20 is preferably a non-contact subsystem that allows measuring a roughness of surface 22, including slag buildup 18, which may have accumulated on inner surface 16 of refractory material 14.

In reference to FIG. 1, antennas 17a, 17b, and 17c are embedded within refractory material 14. Preferably, antennas 17a, 17b, 17c are embedded in one of the layers of refractory material 14. More preferably, antennas 17a, 17b, 17c are positioned such that a transmit signal from antennas 17a, 17b, and 17c propagates through refractory material 14 to reach most of inner surface 16. The subsystem for determining the thickness of refractory material 14 further comprises a transceiver 26 capable of transmitting and receiving electromagnetic waves and a set of cables 19a, 19b, and 19c to couple transceiver 26 to antennas 17a, 17b, and 17c, respectively.

The subsystem for determining the thickness of refractory material 14 may further comprise a data storage device and a primary computer-based processor integrated with transceiver 26. Moreover, at least partly, transceiver 26 may be integrated with one or more of antennas 17a, 17b, and 17c. It is noted that components of transceiver 26, the storage device, and the primary computer-based processor have not been shown as these components are not critical to the explanation of this embodiment.

During determination of the thickness of refractory material 14, and more specifically, a status of inner surface 16 of refractory material 14, the electromagnetic waves transmitted by transceiver 26 through antennas 17a, 17b, 17c that reach inner surface 16 are partly reflected. This reflection is due to the media discontinuity faced by the propagating electromagnetic waves at the interface between refractory material 14 and either the material inside chamber 15 of vessel 12 or slag buildup 18. Preferably antennas 17a, 17b, 17c are positioned such that a transmit signal from antennas 17a, 17b, 17c impinges substantially perpendicular to inner surface 16.

Typically chamber 15 contains steel or air (when chamber 15 is empty). The electromagnetic waves reflected at inner surface 16 are received by antennas 17a, 17b, 17c and sent to transceiver 26 for further treatment, storing, and processing. Transceiver 26 measures the amplitude and phase of the received signals over one or more frequency bands preferably within the 0.5 GHz to 70 GHz range. Moreover upon the processing of these signals using one or more signal processing methods in frequency and/or time domain, a shape of the contour of inner surface 16 may be determined along with a corresponding thickness of refractory material 14 along different points of such contour.

Alternatively, antennas 17a, 17b, 17c might be attached to refractory material 14 of vessel 12, instead of being embedded in refractory material 14. In any case, each of antennas 17a, 17b, and 17c preferably comprises a pyramidal horn antenna having a rectangular cross-section, further comprising a first flared plate having a planar section and two flared sections along opposite side edges of such planar section of the first flared plate, and a second flared plate positioned opposite the first flared plate, wherein such second flared plate comprises a planar section and two flared sections along opposite side edges of such planar section of such second flared plate. More preferably, each of antennas 17a, 17b, and 17c further comprises a dielectric material disposed in at least a portion of a volumetric region, between the first flared plate and the second flared plate, which extends beyond the two flared sections along the opposite side edges of the first flared plate and the second flared plate. Most preferably the dielectric material has a dielectric permittivity that matches the dielectric permittivity refractory material 14 to smooth out the media discontinuity between such dielectric material and refractory material 14. Alternatively, the refractory material itself may be used as the dielectric material.

Those skilled in the art will realize that different types of antennas other than a horn antenna and/or having or not smooth rolled edges may be used as each of antennas 17a, 17b, and 17c. More specifically, horn antennas having four flared plates; non-pyramidal horn antennas, such as conical or the like; or horn antennas with non-rectangular cross-section, such as elliptical, may be used. Likewise, those of ordinary skill in the art will realize that system 10 may further comprise various arrangements of radiofrequency components, such as filters, impedance matching networks, amplifiers, non-coherent detectors and other test instrumentation used in different ways to implement the measurement of transmitted and reflected electromagnetic waves and perform the functions of transceiver 26 and the primary computer-based processor as are known in the prior art. Furthermore, those skilled in the art will realize that cables 19a, 19b, and 19c can be replaced with a wireless system to couple antennas 17a, 17b, 17c to transceiver 26.

System 10 further comprises a surface profiling subsystem 20, for mapping the topography of a slag buildup surface 22, which results from an accumulation of slag buildup 18 on inner surface 16 of refractory material 14. In this case, slag buildup surface 22 is contiguous to (i.e., in contact with) molten material 13 contained within chamber 15 of vessel 12. In a preferred embodiment, surface profiling subsystem 20 is based on a second sensor comprising a laser unit (not shown) and a surface profiling computer-based processor. In addition, the surface profiling computer-based processor comprises a data storage device and an executable computer code configured to measure a distance traveled by a light being transmitted by the at least one laser scanner to a predefined area of inner surface 16 and then being received by the at least one laser scanner to characterize the surface roughness of such predefined area of inner surface 16. The resulting profile of inner surface 16 determines the combined thickness of the refractory material and the thickness of slag buildup on such predefined area of inner surface 16.

Surface profiling subsystem 20 transmits a set of one or more laser beams 28 to illuminate slag buildup surface 22, such that set of beams 28 scan an area of interest of slag buildup surface 22. The reflections of set of beams 28 after impinging upon slag buildup surface 22 are received by surface profiling subsystem 20 to measure a level of roughness of slag buildup surface 22, as well-known in the prior art. In addition, those skilled in the art will realize other alternatives to implement surface profiling subsystem 20 for estimating the roughness of slag buildup surface 22, based on a second sensor comprising at least one or a combination of a stereovision camera, an acoustic sensor, an infrared camera, or a thermal imaging device.

System 10 further comprises a data processing subsystem 24 to manage both the data generated during the operation of system 10 and additional input parameters provided by a user or historical data to produce the results of the evaluation of refractory material 14 for predicting the wear of refractory material 14 and ultimately enhancing the operational life and maintenance of vessel 12. The aforementioned additional input parameters can affect the lifetime and operational capability of the vessel and include the operational age, the average temperature of operation, the heating and cooling temperature rates, the range of temperatures of operation, the number of cycles of operation, the type and quality of the refractory material, the slag buildup on the inner refractory walls as well as the load and grade of the steel to be produced and additives used or to be used, rate of degradation of refractory material, current thickness, number of layers, type, and dimensions of materials in relation to the operating frequency band, type of antenna used, available area for location of the antenna around the vessel, and a history of evaluations of actual and similar vessels.

In addition, data processing subsystem 24 comprises a number of hardware components, such as a data storage device and a main computer-based processor, both of which can be integrated with transceiver 26, to manage the data generated during the operation of system 10 by the refractory material thickness measurement subsystem and surface profiling subsystem 20. Moreover, data processing subsystem 24 may control the operation of the refractory material thickness measurement subsystem and surface profiling subsystem 20. It is noted that the hardware components of data processing subsystem 24, have not been shown as these components are not critical to the explanation of this embodiment and the functions and configurations of these components are well-known in the prior art. Furthermore, in reference to FIG. 1, those skilled in the art will realize that a first set of cables 19a, 19b, and 19c and a second set of cables 11a and 11b, which are used for data communication and control between data processing subsystem 24 and each of the refractory material thickness measurement subsystem and surface profiling subsystem 20, may be replaced with a wireless system.

In a preferred embodiment, data processing subsystem 24 further comprises software, including one or more customized artificial intelligence algorithms developed to predict the degradation and wearing of the material under evaluation as well as to estimate the operational residual life and optimize the maintenance plan of the vessel. In particular, the estimates of the thickness of a material under evaluation, using the first sensor at certain locations, provide a data set that can be used to train these algorithms along with other operational and process parameters, including refractory chemical and physical properties, slag chemistry, molten material, hold time, stir time, and melting temperature. Once the customized algorithms are trained for each of the different zones of a predefined area of interest of the material under evaluation, their performance can be improved with additional estimations of the refractory thickness at different stages of the vessel's life. Alternatively, all the thickness estimation data of the material under evaluation, collected over time, may be used for training or model-building of one or more of the specific artificial intelligence algorithms.

Importantly, the status of refractory material 14 may comprise a level or rate of degradation of such material due to various factors, including operational wear, age, and presence of flaws, cracks, corrosion, and erosion as well as a measure of slag buildup 18 on the surface of refractory material 14, as a result of scrap accumulation and chemical reactions occurring during the melting of metals. Accordingly, data processing subsystem 24 enables system 10 to separately estimate the thickness of refractory material 14 and the thickness of slag buildup 18, while providing information to extend the operational life and improve the maintenance plan of both refractory material 14 and vessel 12.

Furthermore, system 10 comprises a software subsystem configured to enable a user to control one or more computer-based processors for handling the collected data. This data handling includes measuring, storing, monitoring, recording, processing, mapping, visualizing, transferring, analyzing, tracking, and reporting of these data for evaluating the status of the material under evaluation and generating an accurate estimation of the overall health of the vessel. In addition, the software subsystem is capable of monitoring and controlling the system operations not only locally, but also remotely through a computer network or a cloud computing environment. The data visualization includes displaying two-dimensional and three-dimensional images of the results of the evaluation of a status of a material.

The data processing and image processing algorithms may be implemented by using one or a combination of more than one technique. These techniques may include Fourier transform, spectral analysis, frequency- and time-domain response analyses, digital filtering, convolution and correlation, decimation and interpolation, adaptive signal processing, waveform analysis, and data windows and phase unwrapping for data processing; and time domain, back projection, delay and sum, synthetic aperture radar imaging, back propagation, inverse scattering, and super-resolution, either with or without the application of differential imaging, for image processing. The signal processing technique may be selected according to a characteristic of the material under evaluation, such as thickness, number of layers, type, and dimensions of materials possibly in relation to the operating frequency band, type of antenna used, and available area for location of the antenna around the vessel.

Figure 2:
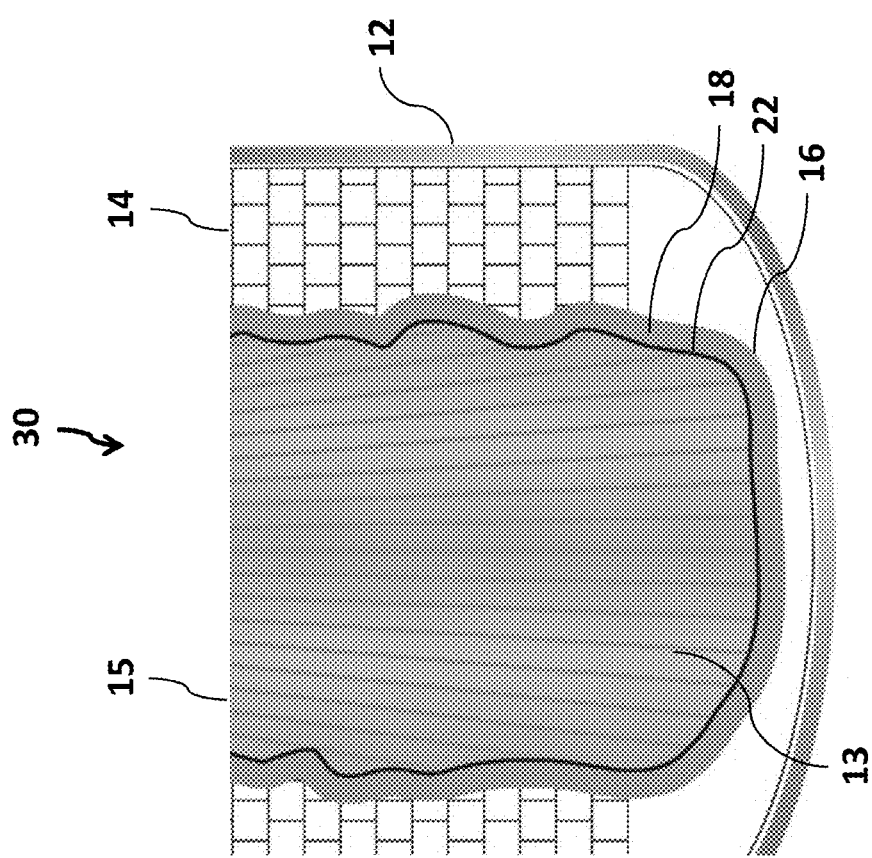
FIG. 2 shows a schematic side view of a part of an internal refractory wall of a metallurgical vessel with a degraded surface and slag buildup.

FIG. 2 shows a schematic side view of a section 30 of part of a refractory wall of a vessel 12. In particular, FIG. 2 is a zoomed in view of a portion of FIG. 1, illustrating part of vessel 12, comprising a refractory material 14 and a chamber 15 within which a molten material 13, such as steel, is contained. Refractory wall 14 has an inner surface 16, which delineates the wearing of refractory wall 14 as a result of being contiguous to molten material 13. During operation of vessel 12, a slag buildup 18 accumulates on at least certain areas of inner surface 16 of refractory material 14. As a result, a slag buildup surface 22 is defined, which in general is irregular, especially at different parts of refractory material 14. Accordingly, existing surface profiling systems can only estimate the combined thickness of slag buildup 18 and the thickness of refractory material 14, which may translate into a significant error in the estimation of each of the thickness of refractory material 14 or the thickness of slag buildup 18. Thus, the use of a surface profiling system requires an additional technique to more accurately and separately estimate each of the thickness of refractory material 14 and the thickness of slag buildup 18.

The various embodiments have been described herein in an illustrative manner, and it is to be understood that the terminology used is intended to be in the nature of words of description rather than of limitation. Any embodiment herein disclosed may include one or more aspects of the other embodiments. The exemplary embodiments were described to explain some of the principles of the present invention so that others skilled in the art may practice the invention.

Method

Figure 3:
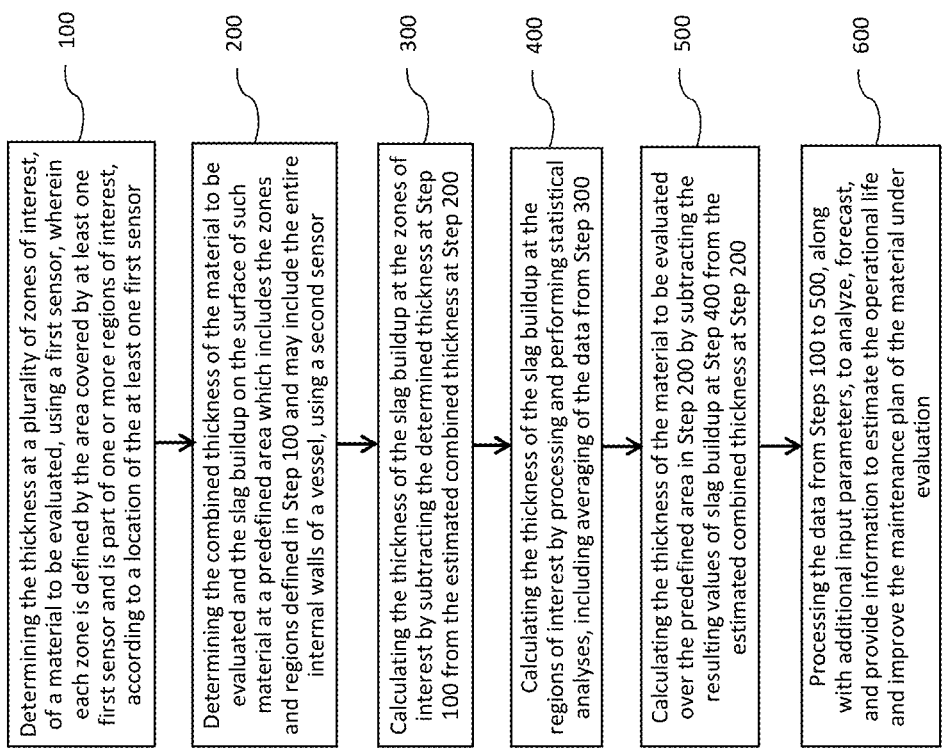
FIG. 3 shows a schematic view of a method for evaluating the status of a material and separately determining the thickness of a material and the thickness of the slag buildup on the surface of such material and estimating the operational life and improving the maintenance plan of a metallurgical vessel.

The method for evaluating a status of a material is operative to combine measurements from a first sensor and a second sensor, and to use a data processing subsystem to separately determine the slag buildup thickness and the refractory thickness over an area of or the entirety of the refractory internal wall of a metallurgical vessel. FIG. 3 shows a schematic view of a method for evaluating the status of a material and separately determining the thickness of a material and the thickness of the slag buildup on the surface of such material and estimating the operational life and improving the maintenance plan of a metallurgical vessel. A first sensor, such as a radar or an ultrasound unit, is used to collect data for estimating the refractory thickness at specific locations in the vessel. A second sensor, such as a laser, infrared, or stereovision unit, is used to get a surface profile of the refractory internal wall and estimate the combined thicknesses of the refractory and the slag buildup over a predefined area, which may include the entire area of the refractory internal wall of the vessel. Finally, a data processing component is used to estimate the thickness over such predefined area, according to the following steps:

1. At step 100, determining the thickness of a material to be evaluated, such as the refractory thickness of the internal refractory wall of a metallurgical vessel, using at least one first sensor, such as an antenna, capable of withstanding temperatures above 1000° C. and transmitting and receiving electromagnetic waves to and from an area surrounding the first sensor, such that these electromagnetic waves impinge upon and reflect from at least part of a predefined area of a material to be evaluated. Preferably, a plurality of antennas are properly positioned at specific locations to more efficiently perform the evaluation of at least a larger portion of the predefined area of the material to be evaluated. More preferably, such predefined area comprises a plurality of zones of interest of the internal walls of the vessel, wherein each of these zones has an associated zone area, defined by the coverage area of each antenna over the internal wall of the vessel. Most preferably, one or more zone areas are part of one or more regions of interest, wherein said one or more regions of interest conform to said predefined area of said material under evaluation.
2. Next, at step 200, determining the combined thickness of the material to be evaluated and the slag buildup on the surface of such material, using at least one second sensor, such as a sensor comprising a laser unit, capable of determining the surface profile of the predefined area of the material under evaluation, as described in step 100, such that it is possible to estimate the surface roughness of the material under evaluation, including any slag buildups on the surface of such material, over the predefine area under evaluation. Preferably, the predefined area wherein the combined thickness is estimated comprises the majority or the entirety as well as the plurality of zones and regions of interest of the internal walls of the vessel identified in step 100.
3. Next, at step 300, calculating the thickness of the slag buildup on the surface of the material under evaluation, corresponding to the plurality of zones of interest within the predefined area of the material under evaluation, by subtracting the estimated thickness of the material to be evaluated at step 100 from the estimated combined thickness of the material to be evaluated and the slag buildup on the surface of such material at step 200.
4. Next, at step 400, processing the data from step 300, which comprises performing statistical analyses, including averaging, of the calculated values of the thickness of the slag buildup on the surface of the material under evaluation, corresponding to the plurality of zones of interest within the predefined area of the material under evaluation. Preferably, this results in an average value of the slag buildup thickness for each of the regions of interest within the predefined area of the material under evaluation.
5. Next, at step 500, calculating the thickness of the material under evaluation, corresponding to the predefined area of the material under evaluation, beyond the plurality of zones of interest wherein the thickness of the refractory material has been determined, by subtracting the average value of the slag buildup thickness on the surface of such material in the regions of interest, calculated at step 400, from the estimated combined thickness of the material to be evaluated and the slag buildup on the surface of such material at step 200.
6. Last, at step 600, processing the data collected, estimated, or calculated in steps 100 to 500 to analyze, forecast, and provide information useful to extend the operational life and improve the maintenance plan of the material under evaluation and assets utilizing such material in its construction. Preferably, at least one signal processing method is selected to process the data according to a characteristic of the material under evaluation. More preferably, a customized algorithm, based on artificial intelligence, is used to predict the degradation and wearing of the material under evaluation as well as to estimate the operational residual life and optimize the maintenance plan of the vessel. Most preferably, multiple evaluations over the operational life of the vessel are performed to more accurately predict the degradation and wearing of said material under evaluation to better estimate the remaining operational life and improve the maintenance plan of the vessel.

In reference to step 100 and step 200 above, it is to be understood that the order of these steps is interchangeable and the performance of each of these steps does not preclude the execution of the other. In other words, either step 100 or 200 may be executed before, after or concurrently with step 200 or 100, respectively, without imposing any limitations or affecting the performance of the described method and results.

Additionally, in reference to step 100 above, those skilled in the art would realize that a first sensor, comprising an acoustic sensor may be used to estimate the thickness of a material to be evaluated. In this case, acoustic signals would be transmitted and received to and from an area surrounding the sensor, such that these signals impinge upon and reflect from a predefined area of this material. Likewise, in reference to step 200 above, those skilled in the art would realize that currently there are techniques and methods, based on LIDAR scanning, laser scanning, infrared scanning, stereovision, or acoustic technologies that can be used to measure the combined residual refractory thickness and slag buildup thickness. As a result, the referenced second sensor may comprise not only a laser unit, but alternatively a LIDAR unit, an infrared camera, a stereovision camera, or an acoustic sensor.

Furthermore, it is important to select each zone of interest of the internal walls of the vessel, comprising the predefined area of the material to be evaluated, to have a relatively uniform slag buildup thickness. This will provide more accurate estimates of the thickness of the material under evaluation for each zone of interest. In cases wherein the slag thickness of a given zone is not uniform, increasing the quantity of data sampling using the first sensor is recommended to reduce the variability of slag thickness values in each of the first sensor data samples.

In a preferred system configuration, and in reference to step 100 above, estimating the thickness of a material using at least one first sensor, comprising an antenna, further comprises the following steps:

1.1 At step 110, positioning at least one first sensor, comprising an antenna, capable of withstanding temperatures above 1000° C. and transmitting and receiving electromagnetic waves to and from an area surrounding the antenna, such that these signals impinge upon and reflect from a predefined area of a material to be evaluated. In particular, for a metallurgical vessel, the at least one antenna should be positioned attached to or embedded in the refractory material surrounding the chamber, such that the electromagnetic waves are transmitted into the internal walls and/or the bottom of the vessel. Alternatively the at least one antenna may be installed in a structure, which can be inserted inside the chamber. Preferably a plurality of antennas are properly positioned to perform the evaluation of a larger portion of the predefined area of the material to be evaluated more efficiently. Most preferably, multiple zones of interest are selected to evaluate the internal walls and/or the bottom of the vessel.

1.2 Next, at step 120, transmitting at least one electromagnetic wave, using a transmitter and the at least one antenna, as described in step 110, such that the at least one electromagnetic wave impinges upon the material under evaluation. Particularly, for a metallurgical vessel, the at least one electromagnetic wave should be transmitted into the internal walls and/or the bottom of the vessel chamber. Preferably multiple electromagnetic waves are transmitted using a plurality of antennas.

1.3 Next, at step 130, receiving at least one electromagnetic wave, using a receiver and the at least one antenna, as described in step 110, such that the at least one electromagnetic wave has been reflected from the material under the evaluation. Alternatively, the at least one electromagnetic wave has been transmitted by a first antenna and received by a second antenna. Particularly, for a metallurgical vessel, the at least one electromagnetic wave should have been reflected from the internal walls and/or the bottom of the vessel's chamber. Preferably multiple electromagnetic waves are transmitted using a plurality of antennas.

1.4 Next, at step 140, measuring the amplitude and phase of the at least one electromagnetic wave reflected (S11 and/or S22 parameters) from the material under evaluation. Alternatively, measuring the amplitude and phase of the at least one electromagnetic wave transmitted by a first antenna and received by a second antenna (S12 and/or S21 parameters), as described in step 130.

1.5 Next, at step 150, recording the measured amplitude and phase of the at least one electromagnetic wave reflected (S11 and S22 parameters) from the material under evaluation, as described in step 140, in a storing device.

1.6 Next, at step 160, repeating steps 110 to 150 for a plurality of positions of the at least one transmitting and receiving antenna, or alternatively the at least one transmitting antenna and the at least one receiving antenna, to complete the evaluation of the predefined area of the material to be evaluated. In particular, for metallurgical vessel, the plurality of positions of the at least one antenna allow the evaluation of the status of a material comprising the internal walls and/or the bottom of the vessel's chamber.

1.7 Next, at step 170, transferring the collected data to a primary computer-based data processor.

1.8 Next, at step 180, processing the collected data by means of at least one signal processing method. Preferably, the signal processing method is selected according to a characteristic of the material under evaluation.

1.9 Last, at step 190, determining a status of the material under evaluation, based on the results of the processed data.

Those skilled in the art will recognize that the steps above indicated can be correspondingly adjusted for a specific evaluation of a material or a specific type of material under evaluation. In particular, the type of data to be collected may differ in terms of the measurements of the S12 or S21 parameters and/or S11 and S22 parameters, and more specifically, the technique used for processing the collected data.

Once an evaluation of a material is completed, including the processing of the data collected, a status of such material can be determined. The status of a material may include the thickness and a level or rate of degradation of such material due to various factors, including operational wear, age, and presence of flaws, cracks, and erosion as well as the slag buildup. In addition, multiple evaluations of the status of a material over time may be used to create trends to estimate such material degradation as well as forecast the remaining operational life and improve the maintenance plan of metallurgical vessels.

The present system and method for evaluating a status of a material have been disclosed herein in an illustrative manner, and it is to be understood that the terminology which has been used is intended to be in a descriptive rather than in a limiting nature. Those skilled in the art will recognize that many modifications and variations of the invention are possible in light of the above teachings. Obviously, many modifications and variations of the invention are possible in light of the above teachings. The present invention may be practiced otherwise than as specifically described within the scope of the appended claims and their legal equivalents.

I claim:

1. A system for evaluating a status of a refractory material forming part of a metallurgical vessel, wherein an internal wall of said material is exposed to a molten material different from said refractory material, said system comprising:
   a. a first subsystem further comprising at least one first sensor to determine a thickness of said refractory material under evaluation at certain specific locations defining one or more zones of interest of said refractory material;
   b. a second subsystem further comprising at least one second sensor to characterize a surface roughness of said internal wall of said refractory material under evaluation over a predefined area of said internal wall comprising said one or more zones of interest of said refractory material to determine a combined thickness comprising said thickness of said refractory material and a thickness of a slag buildup on said predefined area of said internal wall;

c. a third subsystem further comprising a main computer-based processor further comprising a data storage device and an executable computer code configured to process a first set of data produced by said first subsystem, a second set of data produced by said second subsystem, and additional input parameters to separately estimate said thickness of said refractory material and said thickness of said slag buildup over said predefined area of said internal wall of said refractory material;

wherein each of said at least one first sensor and said at least one second sensor comprises an element selected from a group of an antenna, an ultrasound unit, a laser scanner, a LIDAR device, an infrared camera, a stereovision camera, and a thermal imaging device.

2. The system of claim 1, wherein said thickness of said refractory material over a given area of said internal wall of said refractory material and said thickness of said slag buildup over said given area are estimated separately by subtracting said thickness of said refractory material under evaluation from said combined thickness comprising said thickness of said refractory material and said thickness of said slag buildup.

3. The system of claim 1, wherein said thickness of said refractory material under evaluation at certain regions of interest, comprising said zones of interest of said refractory material, is calculated by performing statistical analyses, including averaging, of said determined thickness of said refractory material under evaluation at said one or more zones of interest of said refractory material.

4. The system of claim 3, wherein said thickness of said refractory material and said thickness of said slag buildup over said predefined area of said internal wall of said refractory material are estimated separately by subtracting said calculated thickness of said refractory material under evaluation at said certain regions of interest, from said combined thickness comprising said thickness of said refractory material and said thickness of said slag buildup on said predefined area, comprising said certain regions of interest of said internal wall.

5. The system of claim 1, wherein said at least one first sensor comprises at least one antenna physically configured to reduce a plurality of reflections and probe ringing of an electromagnetic wave propagating through said at least one antenna, wherein said first subsystem further comprises a transceiver that is electromagnetically coupled to said at least one antenna and is capable of generating said electromagnetic wave transmitted by said at least one antenna and detecting said electromagnetic wave received by said at least one antenna; and a primary computer-based processor comprising a data storage device and an executable computer code configured to measure said electromagnetic wave received by said at least one antenna to produce either time domain data or frequency domain data that is transformed to time domain data and determine a distance traveled by said electromagnetic wave received by said at least one antenna to determine said thickness of said refractory material.

6. The system of claim 5, wherein at least part of an element selected from a group of said transceiver and said primary computer-based processor is embedded in said refractory material.

7. The system of claim 1, wherein said at least one first sensor comprises a pyramidal horn antenna having a rectangular cross-section and comprising a first flared plate having a planar section and two flared sections along opposite side edges of said planar section of said first flared plate, and a second flared plate positioned opposite said first flared plate, said second flared plate comprising a planar section and two flared sections along opposite side edges of said planar section of said second flared plate.

8. The system of claim 7, wherein a thickness of said at least one of said first flared plate and said second flared plate is variable.

9. The system of claim 7, wherein a thickness-to-length ratio of said at least one of said first flared plate and said second flared plate is within the range of 15% to 85%.

10. The system of claim 7, wherein at least a portion of a volumetric region, between said first flared plate and said second flared plate, comprises a dielectric material, which extends beyond said two flared sections along said opposite side edges of said planar section of at least one of said first flared plate and said second flared plate.

11. The system of claim 1, wherein said at least one first sensor comprises an antenna designed and physically configured to operate embedded in and be inherently impedance-matched to said refractory material.

12. The system of claim 1, wherein said at least one first sensor comprises an antenna embedded in at least one casted portion of said refractory material.

13. The system of claim 1, wherein said second sensor comprises at least one laser scanner configured to perform a plurality of laser scans of said predefined area of said internal wall of said refractory material while said vessel is empty, and wherein said second subsystem further comprises a surface profiling computer-based processor comprising a data storage device and an executable computer code configured to measure a distance traveled by a light being transmitted by said at least one laser scanner to said predefined area of said internal wall and then said light being received by said laser scanner to characterize said surface roughness of said predefined area of said internal wall to determine said combined thickness comprising said thickness of said refractory material and said thickness of said slag buildup on said predefined area of said internal wall.

14. The system of claim 1, wherein said executable computer code comprises at least one customized machine learning algorithm.

15. The system of claim 1, wherein said third subsystem is configured to further perform an action selected from a group of estimating a remaining operational life of said vessel and enhancing a maintenance plan of said vessel.

16. The system of claim 1, wherein said one or more zones of interest of said refractory material are circumscribed within said predefined area of said internal wall of said vessel and wherein said predefined area is larger than the summation of all areas of said zones of interest.

17. The system of claim 1, wherein said first subsystem further comprises a transceiver electromagnetically coupled to said at least one first sensor by means of at least one cable capable of withstanding temperatures of at least 1000° C.

18. The system of claim 1, wherein said status of said refractory material forming part of said metallurgical vessel is evaluated while said vessel is not in operation and is at least partly empty.

19. A method for evaluating a status of a refractory material forming part of a metallurgical vessel, comprising:
a. providing a first subsystem comprising at least one first sensor to determine
a thickness of said refractory material under evaluation at certain specific locations defining one or more zones of interest of said refractory material; a second subsystem further comprising at least one second sensor to characterize a surface roughness of an internal wall of said refractory material under evaluation over a predefined area of said internal wall comprising said one or more zones of interest of said refractory material to determine a combined thickness comprising said thickness of said refractory material and a thickness of a slag buildup on said predefined area of said internal wall; and a third subsystem further comprising a main computer-based processor further comprising a data storage device and an executable computer code configured to process a first set of data produced by said first subsystem, a second set of data produced by said second subsystem, and additional input parameters to separately estimate said thickness of said refractory material and said thickness of said slag buildup over said predefined area of said internal wall of said refractory material;

b. determining said thickness of said refractory material under evaluation using said first subsystem further comprising a transceiver capable of transmitting and receiving electromagnetic waves to and from an area surrounding said at least one first sensor, such that said electromagnetic waves impinge upon and reflect from at least a part of a predefined area of said material under evaluation, wherein said predefined area of said material under evaluation comprises a plurality of zones of interest of said internal wall of said refractory material, wherein each of said plurality of zones has an associated zone area defined by a coverage area of said at least one first sensor over said internal wall of said refractory material, and wherein said plurality of zone areas are part of one or more regions of interest conforming said predefined area of said material under evaluation;

c. determining said combined thickness of said material to be evaluated and said thickness of said slag buildup on a surface of said internal wall of said refractory material, using said second subsystem wherein said at least one second sensor characterizes said surface roughness of said internal wall of said refractory material profile over said predefined area of said material under evaluation;

d. calculating said thickness of said slag buildup on said surface of said material under evaluation, corresponding to said plurality of zones by subtracting said determined thickness of said material under evaluation at said plurality of zones from said determined combined thickness of said material under evaluation and said slag buildup on said surface of said material under evaluation over said predefined area;

e. processing said thickness of said slag buildup on said surface of said material under evaluation, corresponding to said plurality of zones, wherein said processing comprises performing at least one statistical data analysis, including averaging, of said calculated values of said thickness of said slag buildup on said surface of said material under evaluation, corresponding to said plurality of zones to determine an average value of said slag buildup thickness on said surface of such material in said regions of interest; and f. calculating said thickness of said material under evaluation over said predefined area of said material under evaluation by subtracting said average value of said slag buildup thickness on said surface of such material in said regions of interest from said determined combined thickness of said material to be evaluated and said slag buildup on said surface of said internal wall of said refractory material.

20. The method of claim 19, further comprising a step of processing a set of data associated with one or more evaluations of said thickness of said material under evaluation over said predefined area of said material under evaluation and one or more evaluations of said thickness of said slag buildup on said surface of said material under evaluation over said predefined area to analyze, forecast, and provide information to perform an action selected from a group of estimating an operational remaining life of said vessel and improving a maintenance plan of said vessel.

21. The method of claim 19, wherein said executable computer code comprises at least one customized machine learning algorithm.

22. The method of claim 21, wherein said customized machine learning algorithm is used to predict a degradation and a wearing of said material under evaluation and to perform said action selected from said group of estimating said operational residual life of said vessel and enhancing improving said maintenance plan of said vessel.

23. The method of claim 19, wherein each of said at least one first sensor and said at least one second sensor comprises an element selected from a group of an antenna, an ultrasound unit, a laser scanner, a LIDAR device, an infrared camera, a stereovision camera, and a thermal imaging device.

* * * * *